W. Frazier,
Belt Fastener,

N° 26,488.

Patented Dec. 20, 1859.

Witnesses:
A. W. Roberts
Jacob Conrad

Inventor:
William Frazier

UNITED STATES PATENT OFFICE.

WILLIAM FRAZIER, OF HARTFORD, CONNECTICUT.

IMPROVEMENT IN BELT-FASTENINGS.

Specification forming part of Letters Patent No. 26,488, dated December 20, 1859.

*To all whom it may concern:*

Be it known that I, WILLIAM FRAZIER, of Hartford, county of Hartford, and State of Connecticut, have invented a new and useful Improvement in Belt Clasps or Fasteners; and I do hereby declare that I believe the following to be a full and exact description thereof, reference being had to the accompanying drawings and letters of reference marked thereon.

The nature of this improvement consists, first, in the employment of duplicate plates of rawhide or other flexible or elastic material for connection-plates for joining or securing the ends of belts for driving machinery, and, second, in providing one of the said plates with metallic hooks secured thereto. The hooks or points of which stand in opposite direction from each other, (or outward from the center,) so that by punching holes in the ends of the belt (which are desired to be joined together) the proper or desired distance from the end, and of a corresponding distance apart with the said hooks, the hooks are or may be inserted through the said holes from the under side, and the belt then bent outward sufficiently to allow the hooks to be introduced into or through the perforated holes (or metallic eyelets, which eyelets I propose more particularly to use in flexible or elastic material other than rawhide) in the upper plate, the said holes in which being made of a corresponding distance in either direction, so that when the belt is straightened out the two parts will be firmly joined and secured together, and will run smoothly and noiselessly over pulleys and can be easily attached and detached when desirable without the use of screws, lace-leather, &c., as in the old way.

Figure 1:
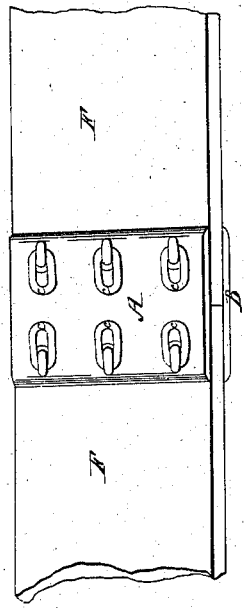

In Figure 1 of the accompanying drawings, F shows sections of a belt having their ends joined or secured together by the device hereinafter shown and described.

Figure 2:
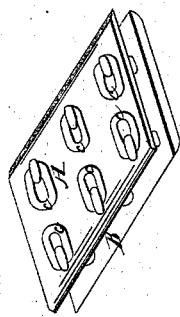

Fig. 2 shows the device coupled together by its hooks in the manner as in use and detached from the belt.

Figure 3:
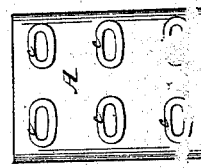

In Fig. 3, A is the upper or outside plate, showing the eyelets c, which I propose to use sometimes or when desirable to prevent the aperatures from tearing out.

Figure 4:

Fig. 4 is a section showing the upper and lower plates, belt, hooks, and eyelets cut in the center of the hooks, eyelets in a line with the length of the belt, as shown by red lines in Fig. 1.

Figure 5:
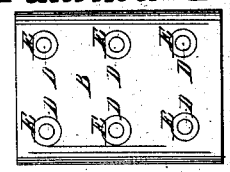

In Fig. 5, B is the under side plate, showing the perforated holes to receive the pivot or dowel-pin of the hook D, which is headed or riveted down over the washer E, thereby securing the hook D firmly to the plate B.

The edge of both the upper and lower plates A B are suitably chamfered or beveled, so as to produce as much as possible a uniform surface with the belt. I propose sometimes in making these plates to use leather, india-rubber, or other flexible or elastic material.

The hook D is made or formed with a dowel-pin projecting from its base of sufficient length to pass through the plate B and receive the washer E and allow it (the pin) to be headed or riveted down over the washer E. The outer end is bent into nearly right angles with itself (the pin which forms the hook) or with the inner surface with the plate B. The shape of the hook will be more readily understood by reference to the drawings. I propose to make these belt clasps or fasteners in strips of indefinite length, so that a clasp may be cut therefrom at any time to fit the width of any belt on which it is desired to use them. Now in putting together a belt for use with these clasps or fasteners the two ends of the belt to be so coupled together are prepared with perforated holes to correspond with the hooks D in the plate B. Then the ends of the belt F are placed upon the hooks D, as shown in section, Fig. 4; then the two parts of the belt are bent or turned outward, so as to allow the outer or upper plate A to be introduced over and onto the hooks D, thus securing together the two ends of the belt F by the joint action of the hooks D and the plates A B, as clearly shown in section, Fig. 4, thus producing a clasp or fastener for belts that will clasp and hold the two ends of a belt together and will run smoothly and noiselessly over pulleys and that may be easily attached and detached when desirable without the use of metallic plate or plates, screws, or lace-leather. Both of the said plates may be provided with both the hooks and perforated holes and each hook into each other if it be desirable to do so.

I believe I have thus fully described the nature, construction, and operation of my improvement, and in so doing I believe I have clearly shown the advantage to be derived by its use over others now in use.

What I claim therefore, and desire to secure by Letters Patent, is—

The arrangement of duplicate plates A B, of rawhide or other flexible or elastic material, and in providing one (or both) of the plates A B with metallic hooks D, which hooks are made to pass through the perforations in the belt F and in the plate A or B to connect and hold the two ends of the belt F together, (in contradistinction from the use of metallic plates, screws, lace-leather, &c.,) substantially in the manner as and for the purpose described.

WILLIAM FRAZIER.

Witnesses:
A. W. ROBERTS,
JACOB CONRAD.